United States Patent
Hatemata

(10) Patent No.: US 7,446,670 B2
(45) Date of Patent: Nov. 4, 2008

(54) LOAD TERMINAL FOR USE IN A REMOTE CONTROLLED LOAD MANAGEMENT SYSTEM

(75) Inventor: Takeshi Hatemata, Neyagawa (JP)

(73) Assignee: Matsushita Electric Works, Ltd., Osaka (JP)

( * ) Notice: Subject to any disclaimer, the term of this patent is extended or adjusted under 35 U.S.C. 154(b) by 28 days.

(21) Appl. No.: 11/785,938

(22) Filed: Apr. 23, 2007

(65) Prior Publication Data

US 2007/0257648 A1    Nov. 8, 2007

(30) Foreign Application Priority Data

Apr. 25, 2006    (JP)    ............................ 2006-121340

(51) Int. Cl.
*H04L 7/00*    (2006.01)
*G05B 23/02*    (2006.01)

(52) U.S. Cl. ................... 340/825.2; 340/3.22; 340/3.8; 340/3.9

(58) Field of Classification Search ................... 340/31, 340/3.2, 3.22, 3.8, 3.9, 825.2, 825.22; 375/219, 375/220, 221; 700/12, 22
See application file for complete search history.

(56) References Cited

U.S. PATENT DOCUMENTS

| | | | | |
|---|---|---|---|---|
| 4,912,723 A * | 3/1990 | Verbanets, Jr. | ............... | 375/220 |
| 6,211,626 B1 * | 4/2001 | Lys et al. | ..................... | 315/291 |
| 6,331,756 B1 * | 12/2001 | Belliveau | ..................... | 315/316 |
| 6,813,525 B2 * | 11/2004 | Reid et al. | ..................... | 700/19 |
| 6,888,472 B2 * | 5/2005 | Yoshimura et al. | ..... | 340/825.22 |

* cited by examiner

*Primary Examiner*—Thuy Vinh Tran
(74) *Attorney, Agent, or Firm*—Bacon & Thomas, PLLC

(57) ABSTRACT

A load terminal for use in a remote controlled load management system includes a control unit for starting to count a delay time and sending to a central controller monitoring data indicating that an illumination load has been turned off while controlling a power supply ON/OFF unit to keep the power supply to the illumination load when a transmission signal including a control data instructing to turn off the illumination load is received by a transmission signal transceiver unit. The control unit restarts the count of the delay time when the transmission signal transceiver unit receives a transmission signal including a control data instructing to turn on the illumination load during the count of the delay time from the central controller.

8 Claims, 15 Drawing Sheets

LOAD TERMINAL FOR USE IN A REMOTE CONTROLLED LOAD MANAGEMENT SYSTEM

FIELD OF THE INVENTION

The present invention relates to a load terminal for use in a remote controlled load management system.

BACKGROUND OF THE INVENTION

Conventionally, there has been known a remote controlled load management system, as shown in FIG. 14, for controlling loads, for instance, illumination loads or lamps L (see, e.g., Japanese Patent Laid-open Publication No. 2003-111154 and U.S. Pat. No. 6,888,472 B2). Such a remote controlled load management system includes a central controller 100, a plurality of switch terminals 101 and a plurality of load terminals 102, which are connected for intercommunications with each other through a two-wire transmission line Ls.

The load terminals 102 include a normal type 102a for turning on and off the lamps and a dimmer type 102c capable of dimming the lamps L. Each of the load terminals 102a and 102c is provided with load ports 122 for connection with up to four lamps L and with a line port 24 for connection with the transmission line Ls. Each load terminal includes an intelligent section having load addresses respectively allocated to the load ports, i.e., the loads connected thereto, and includes relays for turning on and off the loads in response to a command transmitted from the central controller 100. The dimmer type load terminal 102c is added with a dimmer which provides a dimmer command for varying illumination power being fed to the lamp L in response to the command from the central controller 100. Further, each load terminal is given a function of transmitting back to the central controller a status signal indicative of a condition of the lamp.

The switch terminals 101 includes three types, one being a normal type 111a for turning on and off the associated lamps individually, another being a pattern type 101b for turning on and off a group of the lamps in accordance with a predetermined pattern, and the rest being a dimmer type 101c for dimming the lamp. The pattern type switch terminal 101b is utilized to actuate in accordance with a selected pattern of control for the lamps. For this purpose, the switch terminal of this type is associated with the selected lamps and the selected control method. Such relation is stored in the central controller 100. Each of the switch terminals includes at least one switch Sa or Sb which is given individual switch addresses, each being associated with one or more loads, i.e., the load addresses at the central controller 100 such that the load or loads are actuated by the manipulation of the switch. That is, each switch terminal has an intelligent function of transmitting an event signal indicative of the switch being manipulated followed by the switch address of the switch and a particular one of control codes assigned to the switch as indicative of the manner of actuating the lamp or lamps.

The central controller 100 which governs the whole operation of the system and has an address table which relates each of the switches addressed to at least one load address, and a control table relating each of the control codes to a control method for operating the lamp or lamps. The central controller 100 generates and regularly transmits a time division multiplex signal Vs to the switch terminals 101 and the load terminals 102 via the transmission line Ls. As shown in FIG. 15, the signal Vs is a pulse modulated signal having an amplitude of ±24 V and includes a synchronous sign SY indicative of a start of the signal transmission, a mode data MD indicating a mode of controlling the load terminals or the switch terminals, an address data AD describing the address designating the lamp and the switch, a control data CD describing the control method, a check sum data CS for checking a transmission error, and a response waiting slot WT for receiving a response from the switch terminal or the load terminal. The mode data MD includes a control mode for controlling the lamp or lamps, a polling mode, a polling-interrupted mode initiated by the manipulation of the switch, i.e., the event signal from the switch terminal, and a supervision mode for supervising the status of the lamp or lamps.

When the switch terminal 101 or the load terminal 102 whose address coincides with the address given in the address data AD, the terminal responds to operate in a manner as required in the control data CD and to send back a response signal within the response waiting slot WT when so required. The response signal is responsible for transmitting the switch or load address, the control code, and the status information of the switch or the lamp, and is realized by a level-shifted signal that is a combination of high and low current level appearing between the two wires of the transmission line.

In operation, the central controller 100 is normally set into a polling mode to query whether any one of the switch terminals 101 issues an event signal as a result of the switch being manipulated. The event signal is issued from the switch terminal as an interruption signal $V_{INT}$ in synchronous with the synchronous sign SY at the start of the signal Vs, as shown in FIG. 15. Under this condition, the switch terminal 101 sets an interruption flag so as to be prepared for data transfer to and from the central controller 100. Upon acknowledging the interruption signal $V_{INT}$ or the event signal from the switch terminal 101, the central controller 100 is switched into the polling-interrupted mode in order to receive the switch address issuing the event signal as well as the control code within the response waiting slot WT. After receiving the switch address, the central controller 100 references the address table to locate the load address of the destined lamp or loads associated with the switch address. Then, the central controller 100 is set into the supervision mode in order to inquire the status of the destined lamp. In this response, the load terminal 102 connected to the destined lamp or lamps sends back the status information of the lamp to the central controller 100 which in turn transmits a confirmation signal to the switch terminal 101 and references the control table with the help of the status information of the lamp so as to obtain the control method as intended by the control code for operating lamp. Then, the central controller 100 transmits a control signal indicative of the load address and the control method to the corresponding load terminal 102 in order to actuate the lamp in the manner defined by the control method. Thereafter, the load terminal 102 sends a signal indicating the result of the control, thereby completing the requested control initiated by the event signal from the switch terminal 101.

Meanwhile, there is a case where the remote controlled load management system includes a programmable timer unit 105 for performing a load control (timer control) by automatically turning on/off the illumination loads L at preset times instead of turning on/off the illumination loads L through the manipulation of the normal type switch terminal 101a or the pattern type switch terminal 101b. The programmable timer unit 105 stores therein a program designating ON/OFF timings of the load control for each day of each week and control details, such as individual control, group control and pattern control, compares the set time data of the program with current time data, and outputs a no-voltage contact signal by opening/closing the internal output relays when the two time data coincide with each other. The input terminals of contact input terminals 106 are respectively connected to a plurality of contact signal output terminals of the programmable timer unit 105, and the contact input terminals 106 send monitoring data based on a contact signal outputted from the programmable timer unit 105 to the central controller 100, so that the central controller 100 sends control data based on the monitoring data to the load terminals 102, thereby performing the load control in accordance with the control details of the program at set times. Furthermore, a remote control transformer 107 is connected to the programmable timer unit 105 and the contact input terminal 106. The remote control transformer 107 drops the alternating voltage of, e.g., 100 V to 24 V, and the dropped voltage is supplied as operation voltage to the programmable timer unit 105 and the contact input terminal 106.

In case of automatically turning off the illumination loads L by using the programmable timer unit 105 as described above, however, a security concern may be raised when all of the illumination loads L are turned off at a set time. Accordingly, there is required a function of turning off and on the illumination loads L and then completely turning them off after a specified time period before the illumination loads L are turned off at a set time, so that the lighting of the illumination loads L can be extended for the specified time period through the switch manipulation or the like. While the aforementioned load terminals 102 can turn off the illumination loads L by driving the relays after a predetermined delay time (corresponding to the specified time period) at the time of receiving control data related to extinction from the central controller 100, the load terminals 102 immediately turn on the illumination loads L when they receive control data related to lighting from the central controller 100 during the delay time, so that it is impossible to extend the delay time and turn off the illumination loads L after the corresponding delay time.

SUMMARY OF THE INVENTION

It is, therefore, an object of the present invention to provide a load terminal for use in a remote controlled load management system, which is capable of arbitrarily extending a delay time for the extinction of illumination loads in a case where the extinction of the illumination loads is delayed by a predetermined time period when the illumination load is turned off.

In accordance with an aspect of the present invention, there is provided a load terminal for use in a remote controlled load management system including a central controller, one or more switch terminals and one or more load terminals which are connected for intercommunications with each other through a two-wire transmission line, respective addresses being set for the switch terminals and the load terminals, in which the central controller individually accesses the switch terminals and the load terminals by sending a transmission signal containing address data through the transmission line, generates control data based on monitoring data when receiving the monitoring data from a switch terminal which is manipulated during a response waiting slot set in synchronization with the transmission signal, and sends the control data to a load terminal having an address corresponding to that of the switch terminal from which the monitoring data is generated to control an illumination load connected to the load terminal, the load terminal including: a transmission signal transceiver unit for sending and receiving a transmission signal to and from the central controller; a power supply ON/OFF unit for allowing/cutting a power supply to the illumination load; and a control unit for, when a transmission signal including a control data instructing to turn off the illumination load is received by the transmission signal transceiver unit, starting to count a delay time and sending to the central controller monitoring data indicating that the illumination load has been turned off while controlling the power supply ON/OFF unit to keep the power supply to the illumination load; wherein the control unit restarts the count of the delay time when the transmission signal transceiver unit receives a transmission signal including a control data instructing to turn on the illumination load during the count of the delay time from the central controller, and controls the power supply ON/OFF unit to stop-the power supply to the illumination load after termination of the count of the delay time in case the transmission signal transceiver unit receives no transmission signal including a control data instructing to turn on the illumination load from the transmission unit during the count of the delay time.

Preferably, wherein the power supply ON/OFF unit drives an external relay provided in a power supply line from a power source to the illumination load.

Preferably, the power supply ON/OFF unit is provided with a relay provided in a power supply line from a power source to the illumination load and drives the relay.

Preferably, the load terminal further includes dimming unit for performing dimming by controlling an amount of power supplied to the illumination load, wherein the control unit turns on the illumination load in a rated mode or performs dimming lighting on the illumination load with the dimming unit during the count of the delay time.

Preferably, the control unit controls the power supply ON/OFF unit to turn off and then on the illumination load at a time when to start the count of the delay time in response to the control data instructing to turn off the illumination load.

In accordance with the present invention, when receiving control data instructing to turn off the illumination load, the control unit sends to the central controller monitoring data related to the extinction of the illumination load, and when receiving control data instructing to turn on the illumination load from the central controller that has received monitoring data related to the manipulation of a switch from a switch terminal during the count of the delay time, the control unit restarts the count of the delay time, so that the delay time during which the extinction of the illumination load is delayed can be arbitrarily extended when it is desired to delay the extinction of the illumination load by a predetermined time period at the time of turning off the illumination load.

Further, in accordance with the present invention, a warning about the extinction of the illumination load can be provided by turning off and then on the illumination load by controlling the power supply ON/OFF unit at the time when to start the count of the delay time.

BRIEF DESCRIPTION OF THE DRAWINGS

The above and other objects and features of the present invention will become apparent from the following description of embodiments, given in conjunction with the accompanying drawings, in which.

DETAILED DESCRIPTION OF THE EMBODIMENTS

First Embodiment

Figure 1:
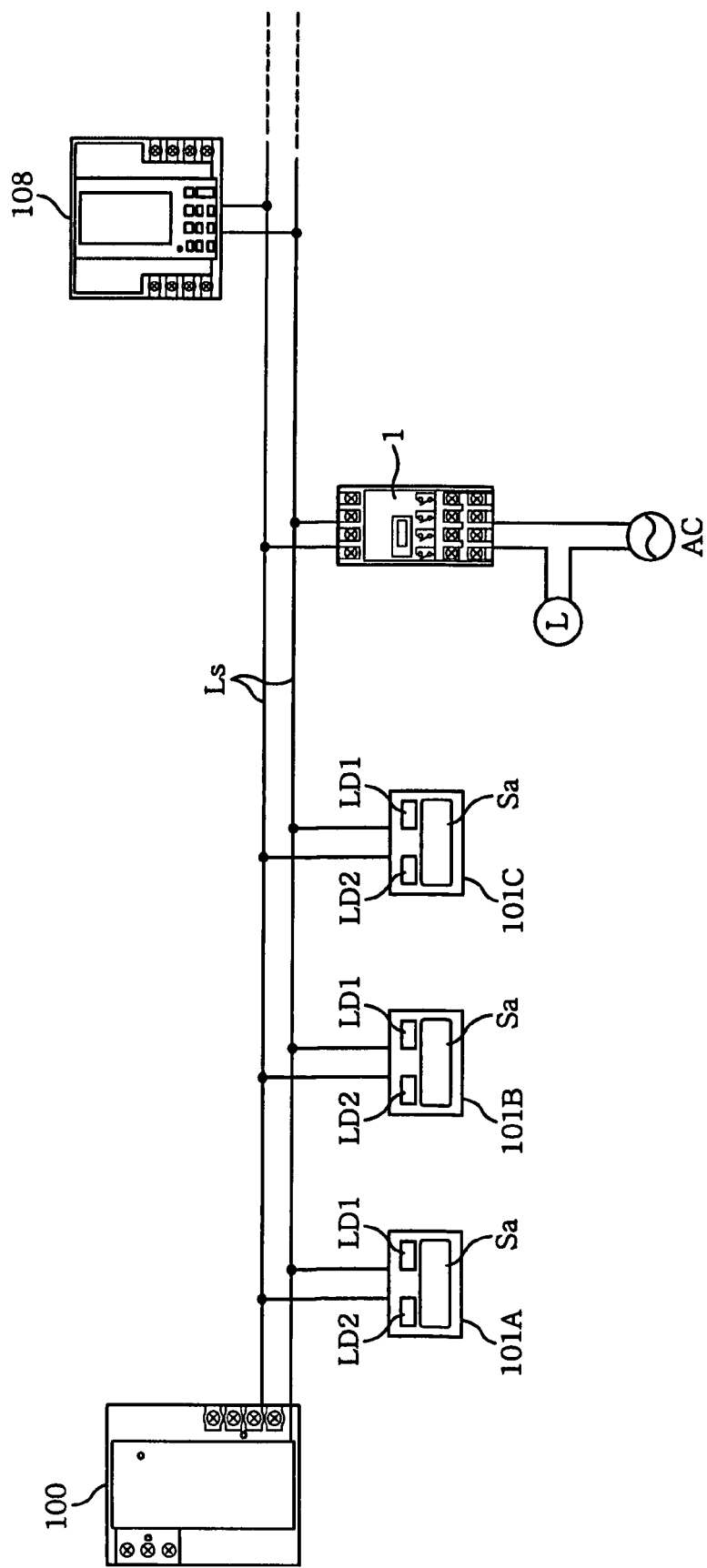
FIG. 1 is a configuration diagram showing an example of a remote controlled load management system including a load terminal (relay terminal) in accordance with a first embodiment of the present invention.

FIG. 1 shows a schematic diagram of a remote controlled load management system including a load terminal (relay terminal) 1 in accordance with a first embodiment of the present invention. The system configuration shown in FIG. 1 is only an example, and the present invention is not limited thereto. Like parts are denoted by like reference numerals in the drawings, and redundant descriptions thereof will be omitted.

A remote controlled load management system includes a central controller 100, the relay terminal 1, switch terminals (individual switches) 101A, 101B and 101C for individually controlling loads, for example, illumination loads L and a programmable timer unit 108, which are connected for inter-communications with each other through a two-wire transmission line Ls. Furthermore, the programmable timer unit 108 includes a unit for transmitting and receiving a transmission signal, and is directly connected to the transmission line Ls without passing through a contact input terminal 106 and exchanges a transmission signal with the central controller 100, unlike a conventional programmable timer unit 105.

Each of the individual switches 101A, 101B and 101C includes a push button-type switch Sa, and indication lamps LD1 and LD2 that are turned on/off in response to an event signal. One indication lamp LD1 includes a red light emitting diode (LED) and indicates the status of a corresponding illumination load L by being turned on or off while the illumination load L is turned on or off. Furthermore, the other indication lamp LD2 includes a green LED and indicates the location of the switch Sa by being turned off while the illumination load L is turned on or vice versa.

Figure 2:
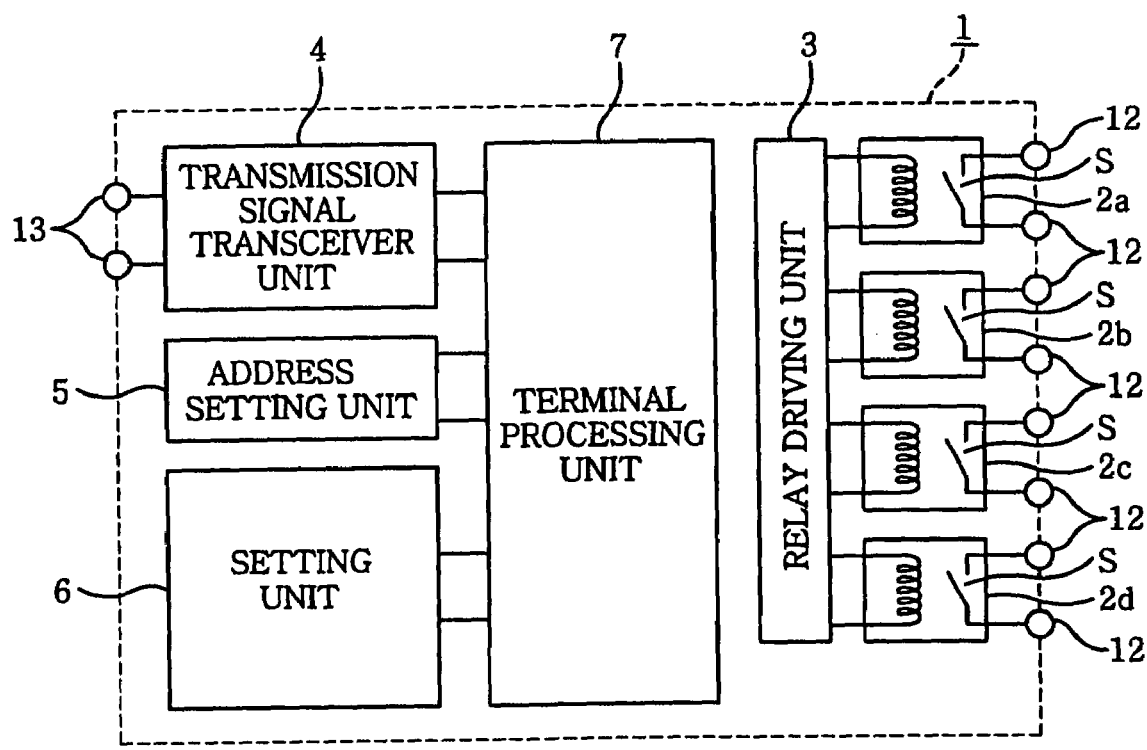
FIG. 2 is a block diagram of the load terminal.

The relay terminal 1 of the first embodiment has a circuit diagram shown in FIG. 2, and includes four latching relays 2a to 2d, a relay driving unit 3 for individually driving the four latching relays 2a to 2d, a transmission signal transceiver unit 4 for exchanging a transmission signal with the central controller 100 via the transmission line Ls, an address setting unit 5 including a DIP switch DS1 for setting up a channel (a part of the address) (a same channel is set for the switch terminal and the load terminal that correspond to each other), a setting unit 6 including a DIP switch DS2 for setting a time period of receiving an extension manipulation (delay time) or an address for ON/OFF of a delay OFF operation (to be described later), and a terminal processing unit 7 for performing the control of the entire terminal. The address setting unit 5 and the setting unit 6 may respectively include rotary switches, instead of the DIP switches DS1 and DS2.

Figure 3:
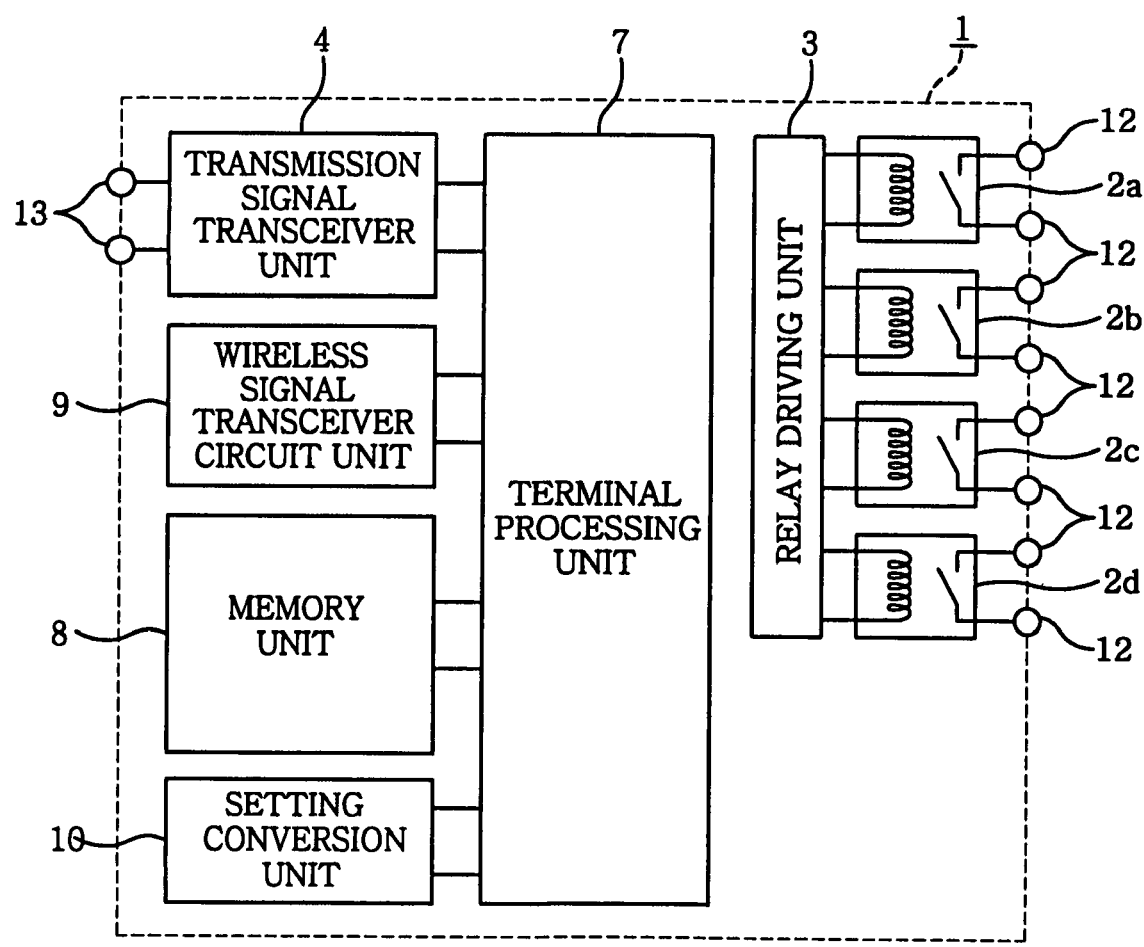
FIG. 3 is a block diagram showing another configuration of the load terminal.

FIG. 3 shows a case where the relay terminal 1 includes a memory unit 8 having EEPROM that can be externally set by using an optical wireless signal, instead of the address setting unit 5 and the setting unit 6. The circuit shown in FIG. 3 includes a wireless signal transceiver circuit unit 9 for transmitting and receiving an optical wireless signal in order to input data for the address or the set time period of receiving an extension manipulation into the memory unit 8 having EEPROM, and to read the inputted data, and a setting conversion unit 10 for converting data set with an optical wireless signal. When receiving an optical wireless signal from an external setting unit (not shown), the wireless signal transceiver circuit unit 9 inputs data into the memory unit 8 or returns the inputted data to the setting unit in response to an instruction from the setting unit. The configuration shown in FIG. 3 provides an easier setting process compared with the case of the DIP switches DS1 and DS2.

Each of the latching relays 2a to 2d is of a two-wire magnetic latching relay. When an excitation current is made to flow through a set coil or reset coil by the relay driving unit 3 in a single short, each of the latching relays 2a to 2d performs an inversion operation, thus inverting a main switching contact S, interposed between a commercial power source AC and the illumination load L, and the operational state is maintained by a permanent magnet even if the excitation current is removed. Further, an inversion operation is performed when the excitation current flows through the set coil or reset coil in the direction of releasing the state maintained by the permanent magnet, and the operational state is kept. That is, in the present embodiment, the latching relays 2a to 2d and the relay driving unit 3 serve as power supply ON/OFF units.

The transmission signal transceiver unit 4 has functions of receiving the transmission signal Vs and sending the transmission signal Vs to the terminal processing unit 7, and short-circuiting the transmission line Ls through an impedance based on response data from the terminal processing unit 7 to send a response signal in a current mode. When the terminal processing unit 7 receives a transmission signal Vs having address data AD that coincide with an address set in the address setting unit 5, the terminal processing unit 7 takes the control data CD to operate the latching relays 2a to 2d through the relay driving unit 3 based on the control data CD. Furthermore, the terminal processing unit 7 has functions of receiving information on the state (ON or OFF state) of the main switching contacts S of the latching relays 2a to 2d from auxiliary contacts provided in the latching relays 2a to 2d, and sending back the information through a response signal from the transmission signal transceiver unit 4 as monitoring data.

Furthermore, when receiving control data CD instructing to turn off the illumination load L, the terminal processing unit 7 begins to count the time period of receiving an extension manipulation (delay time) and sends back monitoring data indicating that the illumination load L has been turned off to the central controller 100, and makes the relay driving unit 3 continuously feed power to the illumination load L without operating the latching relays 2a to 2d until the count of the time period of receiving the extension manipulation is stopped (delay OFF function). That is, in the present embodiment, the terminal processing unit 7 serves as a control unit. Furthermore, the power for operating the latching relays 2a to 2d or the terminal processing unit 7 is obtained by rectifying the transmission signal Vs in a power circuit (not shown).

Figure 4A:
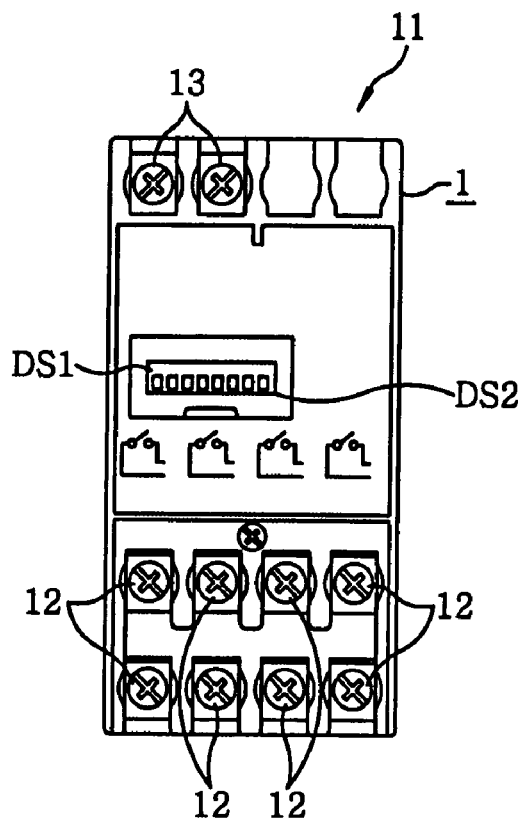
FIGS. 4A to 4C show a front view, a left side view and a bottom view of the load terminal, respectively.
Figure 4B:
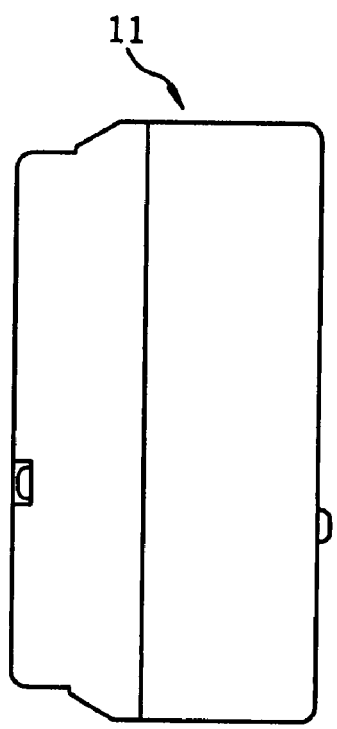
Figure 4C:
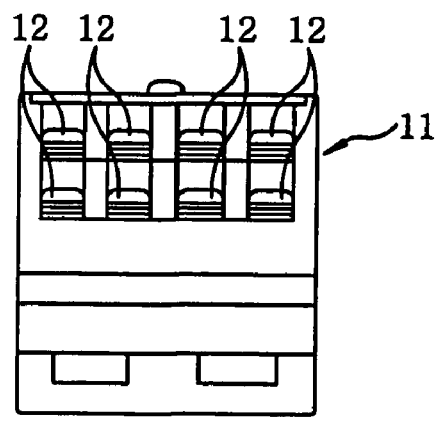

The relay terminal 1 includes an approximately box-shaped housing 11 molded of a synthetic resin, as shown in FIG. 4, and a printed wiring board (not shown) having the above-described circuit thereon is accommodated along with the latching relays 2a to 2d in the housing 11. The housing 11 is formed to have dimensions corresponding to the so-called distribution board convention dimensions (see JIS C8370 Appendix 5). Further, four sets of screw terminal pairs 12 in contact with the main switching contacts S of the latching relays 2a to 2d are arranged in parallel to each other at one longitudinal end side of the housing 11 (the lower side in FIG. 4A), and a pair of screw terminals 13 for connection with the transmission line Ls is arranged in the other longitudinal end side of the housing 11 (the upper side in FIG. 4A). Moreover, the DIP switch DS1 of the address setting unit 5 and the DIP switch DS2 of the setting unit 6 are arranged in parallel to each other in an approximate center portion of the housing 11 in the longitudinal direction thereof. Accordingly, the relay terminal 1 of the present embodiment can be attached to a mounting plate of a home distribution board, and can be arranged in parallel to a branch breaker, which is an internal element of the home distribution board. Furthermore, the shape of the housing is not limited to that shown in FIG. 4, and the housing may have a configuration for attachment to a hook of a system ceiling, instead of being accommodated in the home distribution board.

In the system configuration shown in FIG. 1, the illumination load L is connected to the latching relay 2a corresponding to the load number=1 of the relay terminal 1, individual control channel=0 is set for the address setting unit 5, and channel=1 and load number=1 are set for the setting unit 6 as the ON/OFF address for the delay OFF function. Hereinafter, for example, the address for channel=1 and load number=1 is represented as "1-1" by connecting the channel number with the load number by using a hyphen.

Meanwhile, 0-1 is set as the individual control address for the individual switches 101A, 101B and 101C, and 1-1 as the address for the ON/OFF of the delay OFF function is also set for the individual switches 101B and 101C. The individual switch 101B is set such that, when an event signal is generated by the manipulation of the switch Sa, the individual switch 101B sends to the central controller 100 monitoring data including individual control address 0-1 and an OFF command (extinction), and monitoring data including ON/OFF address 1-1 for the delay OFF function and an OFF command (OFF of the delay OFF function). Furthermore, the individual switch 101C is set such that, when an event signal is generated by the manipulation of the switch Sa, it sends to the central controller 100 monitoring data including an individual control address 0-1 and an ON command (lighting) and monitoring data including ON/OFF address 1-1 for the delay OFF function and an ON command (ON of the delay OFF function).

Furthermore, the programmable timer unit 108 is set such that, at a time set in advance by programming, it sends monitoring data including individual control address 0-1 and a lighting or extinction command to the central controller 100.

Figure 5:
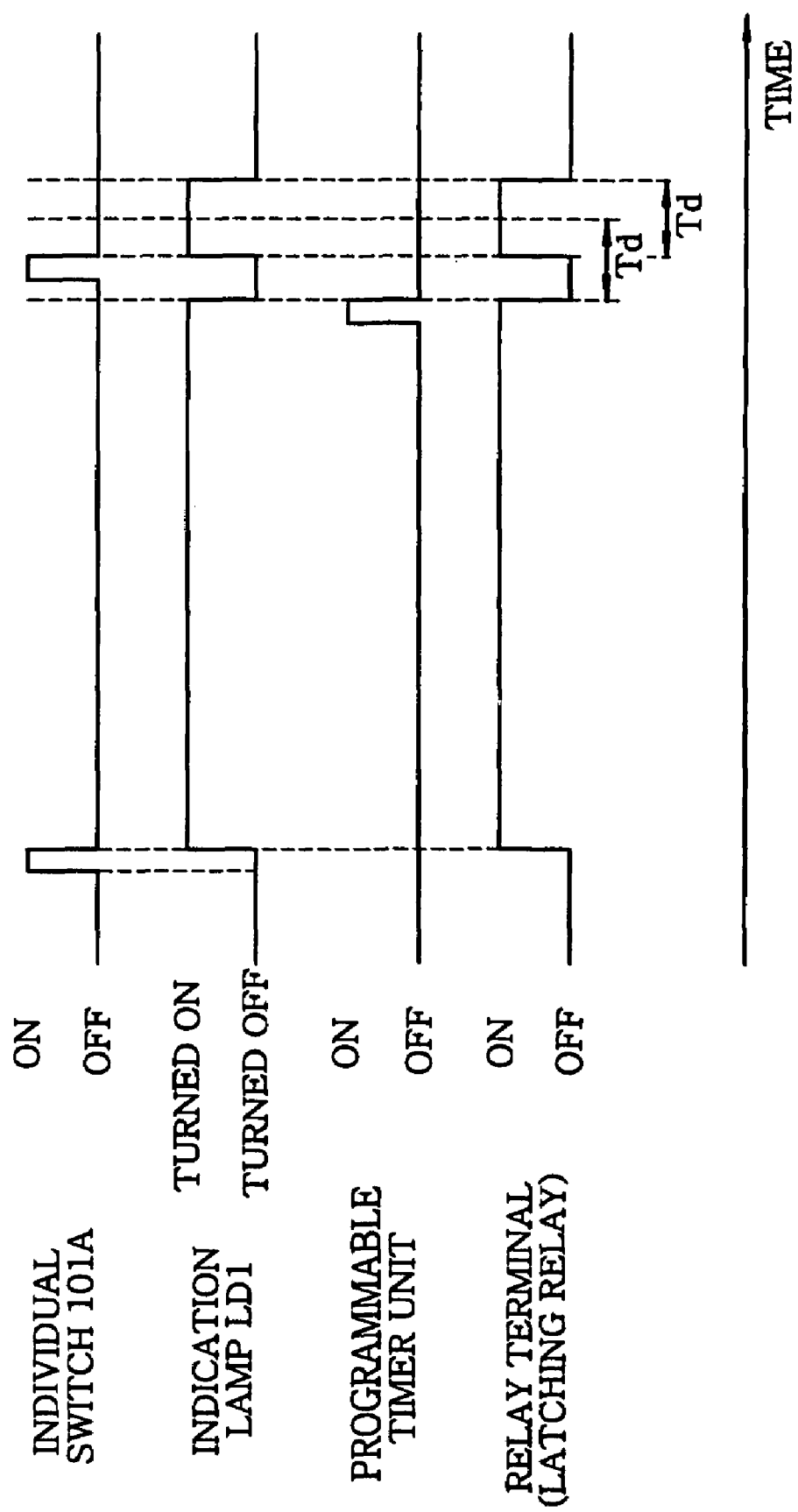
FIG. 5 is a timing chart illustrating the operation of the load terminal.

For example, as shown in the timing chart in FIG. 5, while the illumination load L is turned off, the indication lamps LD1 of the individual switches 101A, 101B and 101C are all turned off and the indication lamps LD2 are all turned on. In this state, when the switch Sa of the individual switch 101A is manipulated, monitoring data (individual control address 0-1) is transmitted from the individual switch 101A to the central controller 100. Then, the central controller 100 sends as control data CD a command to invert the operation of the illumination load L (a command to turn on the illumination load L) to the relay terminal 1 in response to the corresponding monitoring data, and the terminal processing unit 7 turns on the main switching contact S by controlling the relay driving unit 3 to make the latching relay 2a ON based on the corresponding control data CD, thereby turning on the illumination load L. Furthermore, the terminal processing unit 7 sends back to the central controller 100 monitoring data indicating that the main switching contact S of the latching relay 2a has been turned on, and the central controller 100 sends the corresponding monitoring data to the individual switches 101A, 101B and 101C, so that all the indication lamps LD1 of the individual switches 101A, 101B and 101C are turned on and all the indication lamps LD2 are turned off.

At an extinction time set in advance by programming, the programmable timer unit 108 sends monitoring data (an individual control address 0-1 and an extinction command) to the central controller 100, and the central controller 100 sends as control data CD a command to turn off the illumination load L to the relay terminal 1 in response to the corresponding monitoring data. On receiving the corresponding command, the terminal processing unit 7 of the relay terminal 1 starts to count the delay time (the time period of receiving extension manipulation) Td through the delay OFF function while keeping the main switching contact S of the latching relay 2a ON. At this time, the terminal processing unit 7 of the relay terminal 1 sends back to the central controller 100 monitoring data indicating that the main switching contact S has been turned off regardless of the actual operation status thereof. As a result, the central controller 100 sends the corresponding monitoring data to the individual switches 101A, 101B and 101C, so that all of the indication lamps LD1 of the individual switches 101A, 101B and 101C are turned off and all of the indication lamps LD2 are turned on.

Meanwhile, when the switch Sa of the individual switch 101A is manipulated during the count of the delay time Td, the individual switch 101A sends monitoring data (individual control address 0-1) to the central controller 100 and the central controller 100 sends as control data CD a command to invert the operation of the illumination load L (a command to turn on the illumination load L) to the relay terminal 1 in response to the corresponding monitoring data. Then, the terminal processing unit 7, having received the corresponding control data CD, resets the delay time (the time period of receiving extension manipulation) Td during the count, thereby reinitiating the count and sending back to the central controller 100 monitoring data indicating that the main switching contact S is in an ON state. As a result, the central controller 100 sends the corresponding monitoring data to the individual switches 101A, 101B and 101C, so that all of the indication lamps LD1 of the individual switches 101A, 101B and 101C are turned on and all of the indication lamps LD2 are turned off. On the other hand, when the switch Sa of the individual switch 101A is not manipulated during the count of the delay time Td and no command to turn on the illumination load L is received, the terminal processing unit 7 turns off the main switching contact S of the latching relay 2a by controlling the relay driving unit 3 at a time when the delay time (the time period of receiving extension manipulation) Td ends, thereby turning off the illumination load L, and sends back to the central controller 100 monitoring data indicating that the main switching contact S is in an OFF state. As a result, the central controller 100 sends the corresponding monitoring data to the individual switches 101A, 101B and 101C, so that all the indication lamps LD1 of the individual switches 101A, 101B and 101C are turned off and all of the indication lamps LD2 are turned on.

Furthermore, when the switch Sa of the individual switch 101C is manipulated while the illumination load L is turned off, monitoring data including individual control address 0-1 and an ON (lighting) command and monitoring data including ON/OFF address 1-1 for the delay OFF function and an ON command (ON of delay OFF function) are sent to the central controller 100, so that the central controller 100 sends as control data CD a command to invert the operation of the illumination load L (a command to turn on the illumination load L) and the ON command for the delay OFF function to the relay terminal 1 in response to the corresponding monitoring data. In the relay terminal 1, the terminal processing unit 7 controls the relay driving unit 3 to make the latching relay 2a and the main switching contact S ON in accordance with the corresponding control data CD, thereby turning on the illumination load L and making the delay OFF function effective (ON). Furthermore, the terminal processing unit 7 sends back to the central controller 100 monitoring data indicating that the main switching contact S of the latching relay 2a is in the ON state, and the central controller 100 sends the corresponding monitoring data to the individual switches 101A, 101B and 101C, so that all the indication lamps LD1 of the individual switches 101A, 101B and 101C are turned on and all of the indication lamps LD2 are turned off.

In the meantime, at the extinction time set in advance by programming, the programmable timer unit 108 sends monitoring data (individual control address 0-1 and the extinction command) to the central controller 100. The central controller 100 then sends as control data CD a command to turn off the illumination load L to the relay terminal 1 in response to the corresponding monitoring data. The terminal processing unit 7 of the relay terminal 1, having received the corresponding command, starts to count the delay time (the time period of receiving extension manipulation) Td through the delay OFF function while keeping the main switching contact S of the latching relay 2a ON. At that time, the terminal processing unit 7 of the relay terminal 1 sends back to the central controller 100 monitoring data indicating that the main switching contact S is in an OFF state regardless of the actual operation status thereof. As a result, the central controller 100 sends the corresponding monitoring data to the individual switches 101A, 101B and 101C, so that all the indication lamps LD1 of the individual switches 101A, 101B and 101C are turned off and all of the indication lamps LD2 are turned on.

Further, when the switch Sa of the individual switch 101B is manipulated during the count of the delay time Td, monitoring data including individual control address 0-1 and the OFF (extinction) command and monitoring data including ON/OFF address 1-1 for the delay OFF function and the OFF command (OFF of the delay OFF function) are sent to the central controller 100. The central controller 100 then sends as control data CD a command to invert the operation of the illumination load L (a command to turn off the illumination load L) and the OFF command (OFF of the delay OFF function) to the relay terminal 1 in response to the corresponding monitoring data. In the relay terminal 1, the terminal processing unit 7 turns off the main switching contact S by controlling the relay driving unit 3 to make the latching relay 2a OFF in accordance with the corresponding control data CD, thereby turning off the illumination load L and making the delay OFF function ineffective (OFF). Furthermore, the terminal processing unit 7 sends back to the central controller 100 monitoring data indicating that the main switching contact S of the latching relay 2a is in an OFF state, and the central controller 100 sends the corresponding monitoring data to the individual switches 101A, 101B and 101C. As a result, all the indication lamps LD1 of the individual switches 101A, 101B and 101C are turned off and all of the indication lamps LD2 are turned on. That is, when the switch Sa of the individual switch 101B is manipulated during the count of the delay time Td, the count of the delay time Td is stopped and the illumination load L can be immediately turned off.

Accordingly, in the present embodiment, when the relay terminal 1 receives a command to turn on the illumination load L during the count of the delay time Td, the terminal processing unit 7 as a control unit restarts the count of the delay time Td, so that it is possible to arbitrarily extend the delay time Td during which the extinction of the illumination load L is delayed. Furthermore, the delay time Td may be set to any one of, e.g., 5 minutes, 10 minutes, 20 minutes, and 30 minutes in the setting unit 6.

Here, as described in Section of "Background of the Invention", in the case where all of the illumination loads L are automatically turned off by using the programmable timer unit 108, a security concern may be raised when the illumination loads L are all turned off at a set time. Therefore, it is preferable to give a warning about the extinction of the illumination loads L by turning off and then on the illumination loads L before turning off the illumination loads L at the set time. Accordingly, in the relay terminal 1 of the present embodiment, the aforementioned warning flashing can be set in the setting unit 6. When the warning flashing is set in the setting unit 6, the terminal processing unit 7 having received an extinction command from the central controller 100 controls the relay driving unit 3 to make the main switching contact S of the latching relay 21 ON, OFF and then ON within a short period of time, thereby performing the warning flashing of the illumination loads L. Furthermore, it is preferred that the setting of warning flashing in the setting unit 6 be handled by the terminal processing unit 7 depending on the manipulation of an individual switch (not shown) for which an address for warning flashing is set.

Figure 6:
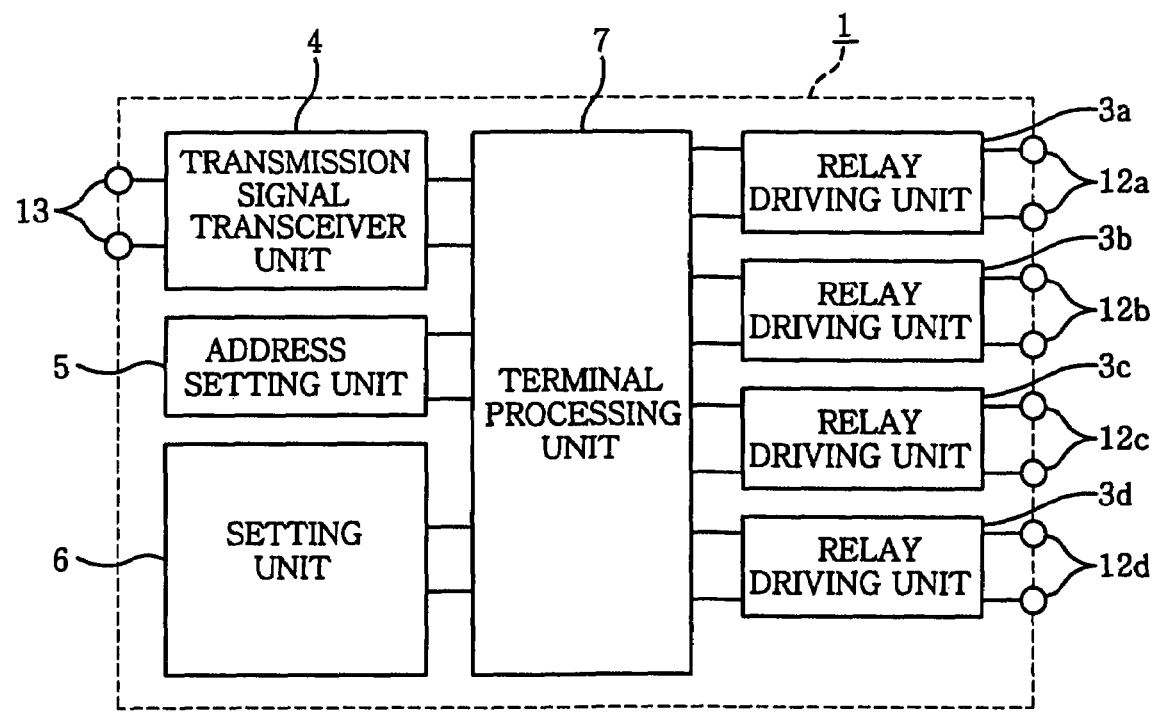
FIG. 6 is a block diagram showing a configuration of the load terminal which contains no latching relay.
Figure 7:
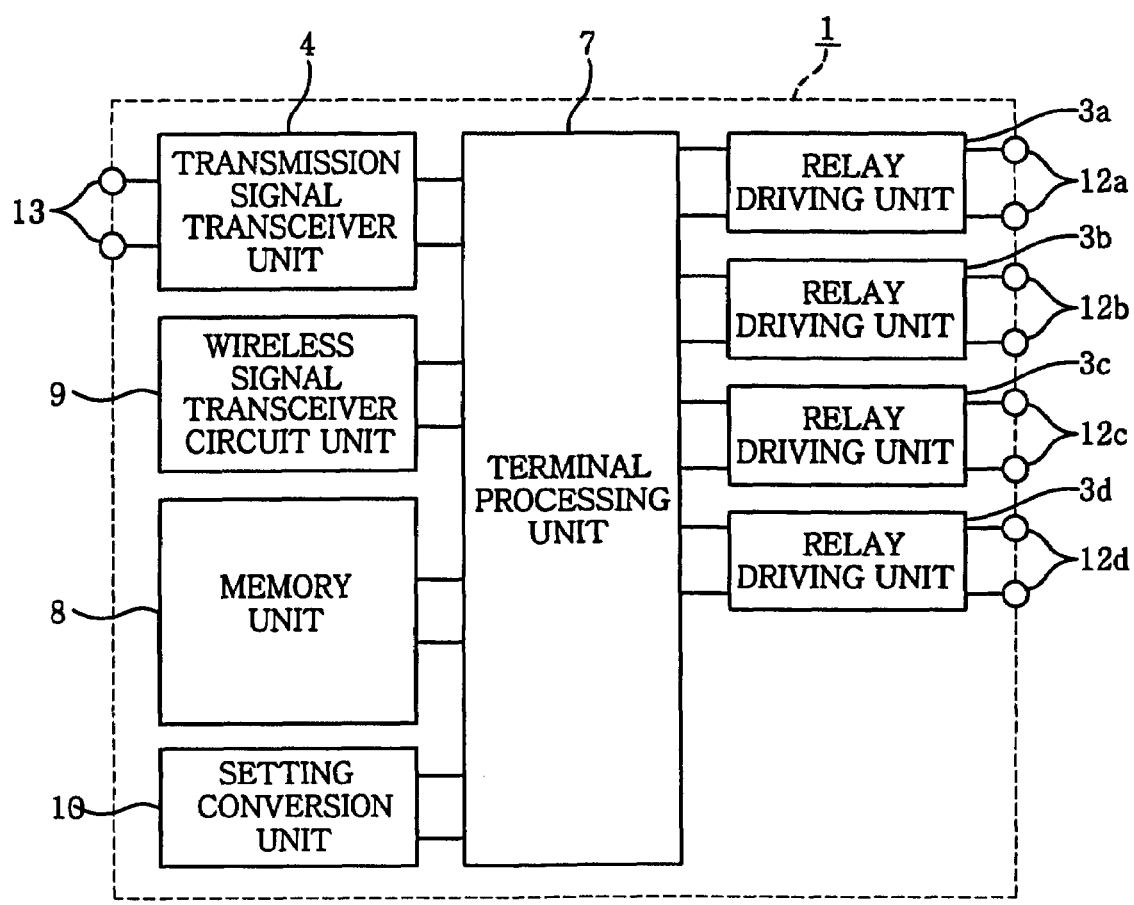
FIG. 7 is a block diagram showing another configuration of the load terminal which contains no latching relay.

Although the relay terminal containing the latching relays for load control is illustrated in the present embodiment, there may be used a relay control terminal including connection terminals 12a to 12d for connecting to external latching relays (not shown) and relay driving units 3a to 3d for driving the latching relays connected to the connection terminals 12a to 12d, as shown in FIG. 6 or 7. The circuit diagram shown in FIG. 6 includes an address setting unit 5 having a DIP switch DS1 and a setting unit 6 having a DIP switch DS2. The circuit diagram shown in FIG. 7 includes a memory unit 8, a wireless signal transceiver circuit unit 9, and a setting conversion unit 10.

Embodiment 2

Figure 8:
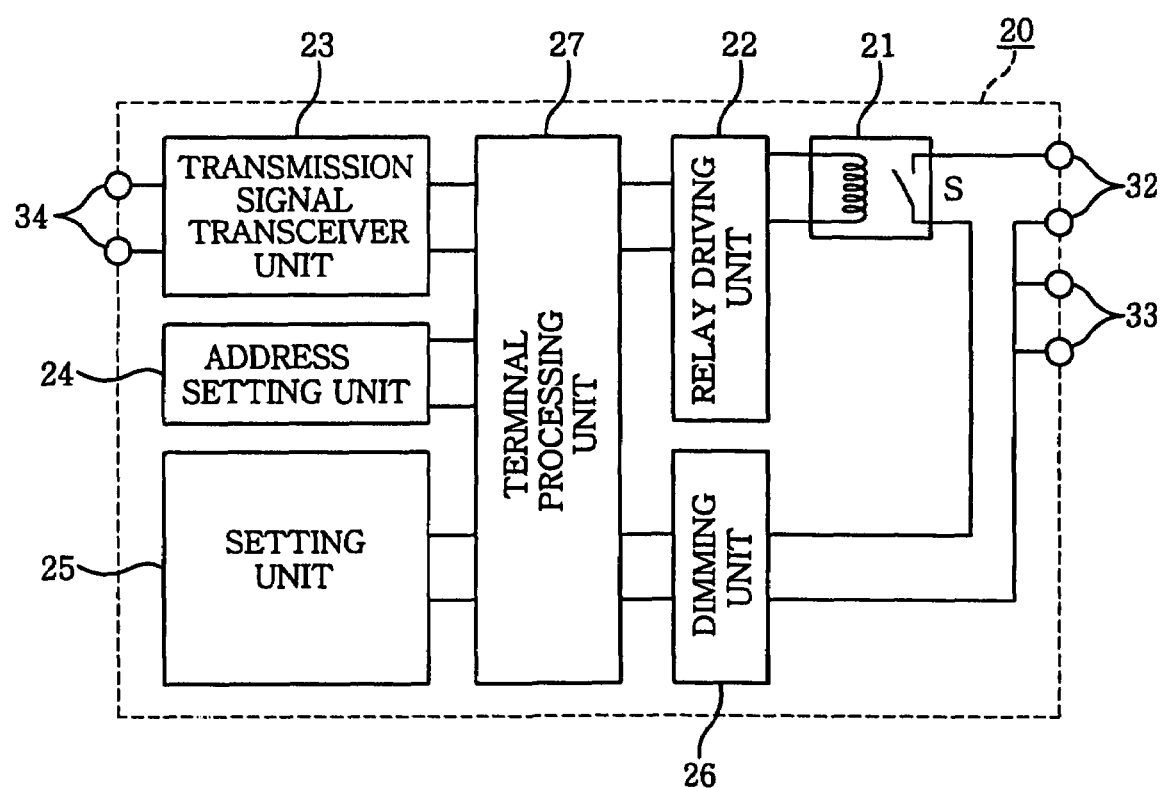
FIG. 8 is a block diagram of a load terminal (dimming control terminal) in accordance with a second embodiment of the present invention.

A load terminal in accordance with a second embodiment of the present invention is a dimming control terminal 20 that performs dimming by controlling the supply of power to an illumination load L such as an incandescent lamp. The control terminal, as shown in FIG. 8, includes a latching relay 21, a relay driving unit 22 for driving the latching relay 21, a transmission signal transceiver unit 23 for exchanging transmission signals with the central controller 100 via the transmission line Ls, an address setting unit 24 having a DIP switch DS1 for setting up a channel, a setting unit 25 having a DIP switch DS2 for setting a time period of receiving extension manipulation (delay time) and ON/OFF address for the delay OFF operation (to be described later), a dimming unit 26 for performing dimming by controlling the supply of power from a commercial power source AC through the latching relay 21 to the illumination load L, and a terminal processing unit 27 for controlling the entire terminal. In the second embodiment, since the latching relay 21, the relay driving unit 22, the transmission signal transceiver unit 23, the address setting unit 24 and the setting unit 25 are the same as those of the relay terminal 1 in the first embodiment, redundant descriptions thereof will be omitted. Further, the address setting unit 24 and the setting unit 25 may have rotary switches instead of the DIP switches DS1 and DS2, respectively.

The dimming unit 26 is provided with a phase control element such as a triac. When dimming data (control data), which is represented in a percentage with a maximum brightness (generally, brightness at the time of rated lighting) set to 100% within a phase control range, is received from the central controller 100, the terminal processing unit 27 detects a zero cross point of a commercial power source AC, and generates a trigger signal with a phase angle corresponding to the dimming data, so that the phase control element of the dimming unit 26 performs dimming on the illumination load L by phase-controlling the commercial power voltage in accordance with the trigger signal.

Figure 9:
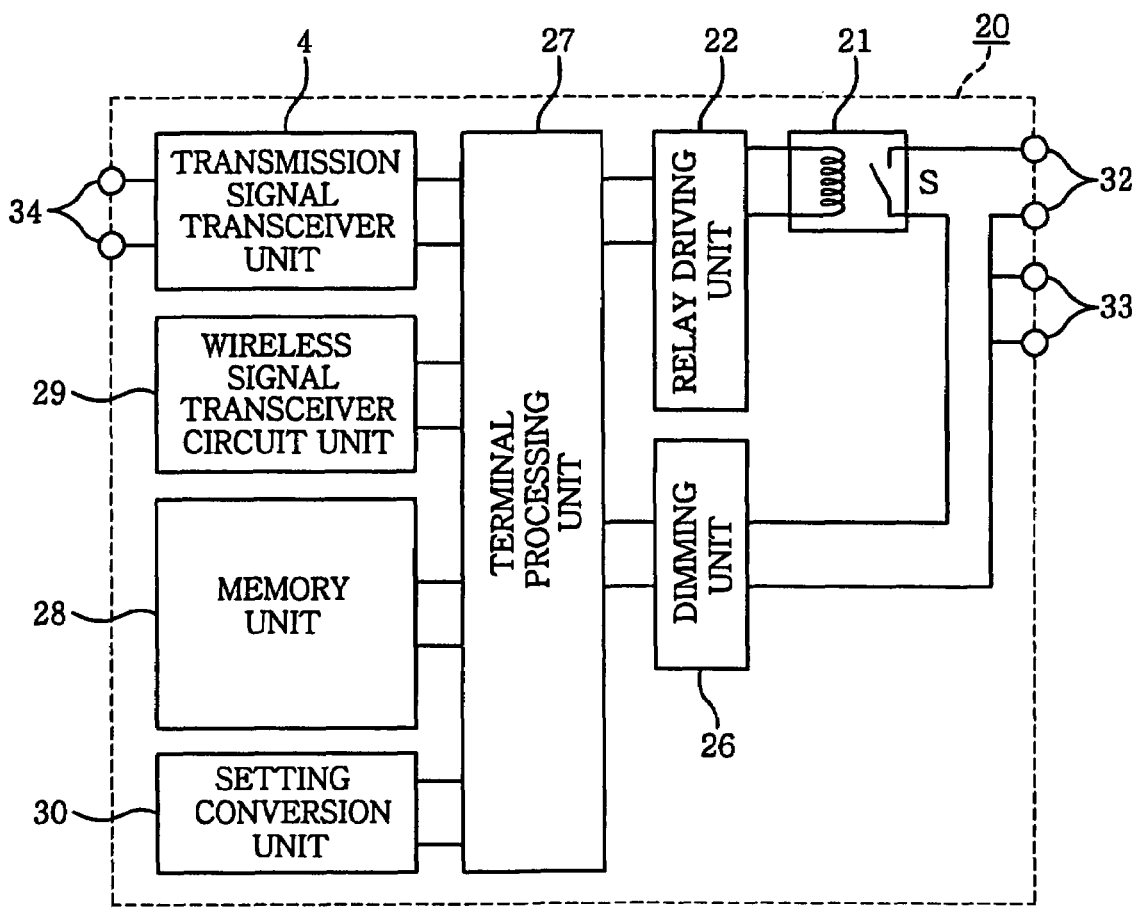
FIG. 9 is a block diagram showing another configuration of the load terminal in accordance with the second embodiment.

Furthermore, FIG. 9 shows a case where a memory unit 28 including EEPROM externally settable by using an optical wireless signal is provided instead of the address setting unit 24 and the setting unit 25. The circuit of FIG. 9 includes a wireless signal transceiver circuit unit 29 for transmitting and receiving an optical wireless signal in order to input data such as an address or a set time period of receiving extension manipulation to the memory unit 28 including EEPROM or to read inputted data; and a setting conversion unit 30 for converting data set with the optical wireless signal. When receiving an optical wireless signal from an external setting unit (not shown), the wireless signal transceiver circuit unit 29 inputs data to the memory unit 28 or sends inputted data to the setting unit in response to an instruction from the setting unit.

Figure 10A:
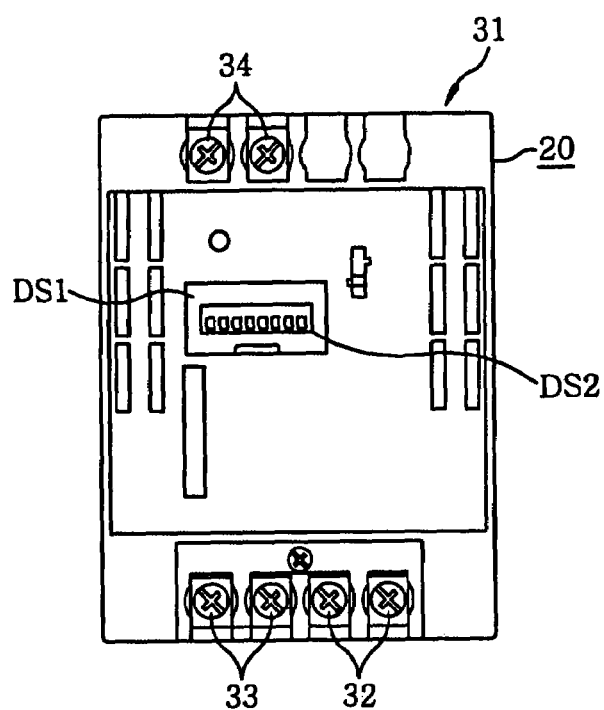
FIGS. 10A to 10C show a front view, a left side view and a right side view of the load terminal, respectively.
Figure 10B:
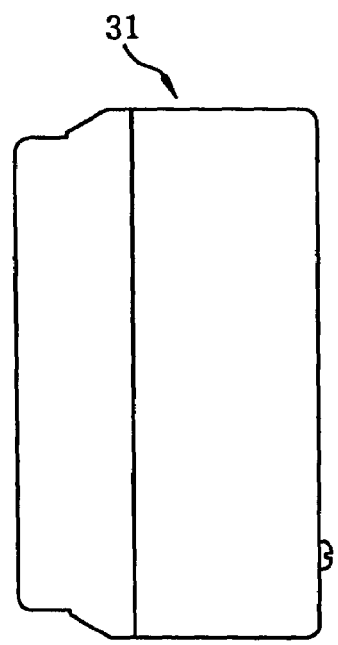
Figure 10C:
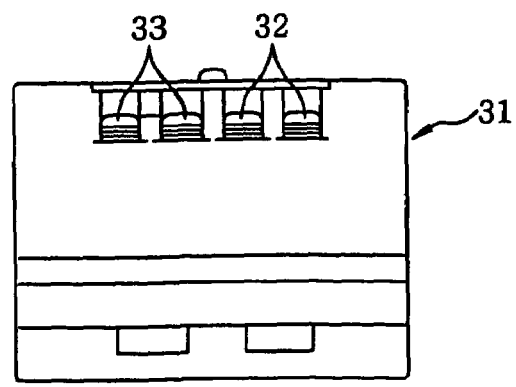

The dimming control terminal 20 is provided with an approximately box-shaped housing 31 molded of an synthetic resin, as shown in FIG. 10. In the housing 31, a printed wiring board (not shown) having thereon the above-described circuit is accommodated along with the latching relay 21. The housing 31 is formed to have dimensions corresponding to distribution board convention dimensions. Specifically, a pair of screw terminals 32 for connection with a commercial power source AC and a pair of screw terminals 33 for connection with the illumination load L are arranged in parallel to each other at one longitudinal end side (the lower side in FIG. 10A) of the housing 31. A pair of screw terminals 34 for connection with the transmission line Ls is arranged at the other longitudinal end side thereof (the upper side in FIG. 10A), and the DIP switch DS1 of the address setting unit 24 and the DIP switch DS2 of the setting unit 25 are arranged in parallel to each other in an approximately center portion of the housing 31 in the longitudinal direction thereof. Accordingly, the relay terminal 20 of the second embodiment may be attached to the mounting plate of a home distribution board to be arranged in parallel to a branch breaker, which is the internal element of the home distribution board. Furthermore, the shape of the housing is not limited to that shown in FIG. 10, and the housing may have a configuration to be attached to a hook in a ceiling instead of being accommodated in the home distribution board.

In this case, an address for the ON/OFF (lighting/extinction) control (individual control) of the illumination load L and an address for the dimming control of the illumination load L are set in the address setting unit 24 of the dimming control terminal 20. With regard to the address for dimming control, the above-described dimming data is sent from the central controller 100 as control data CD. Meanwhile, with regard to the address for individual control, for example, the address for individual control is set to 0-1 in the address setting unit 24 and an address for ON/OFF of the delay OFF function is set to 1-1 in the setting unit 25, as in the relay terminal 1 of the first embodiment.

Accordingly, also in case of providing the dimming control terminal 20 of the second embodiment instead of the relay terminal 1 in the system of FIG. 1, as similarly to the first embodiment, when the dimming control terminal 20 receives a command to turn on he illumination load L during the count of the delay time (the time period of receiving extension manipulation) Td, the terminal processing unit 27 as a control unit restarts to count the delay time Td, so that it is possible to extend the delay time Td during which the extinction of the illumination load L is delayed.

Figure 11:
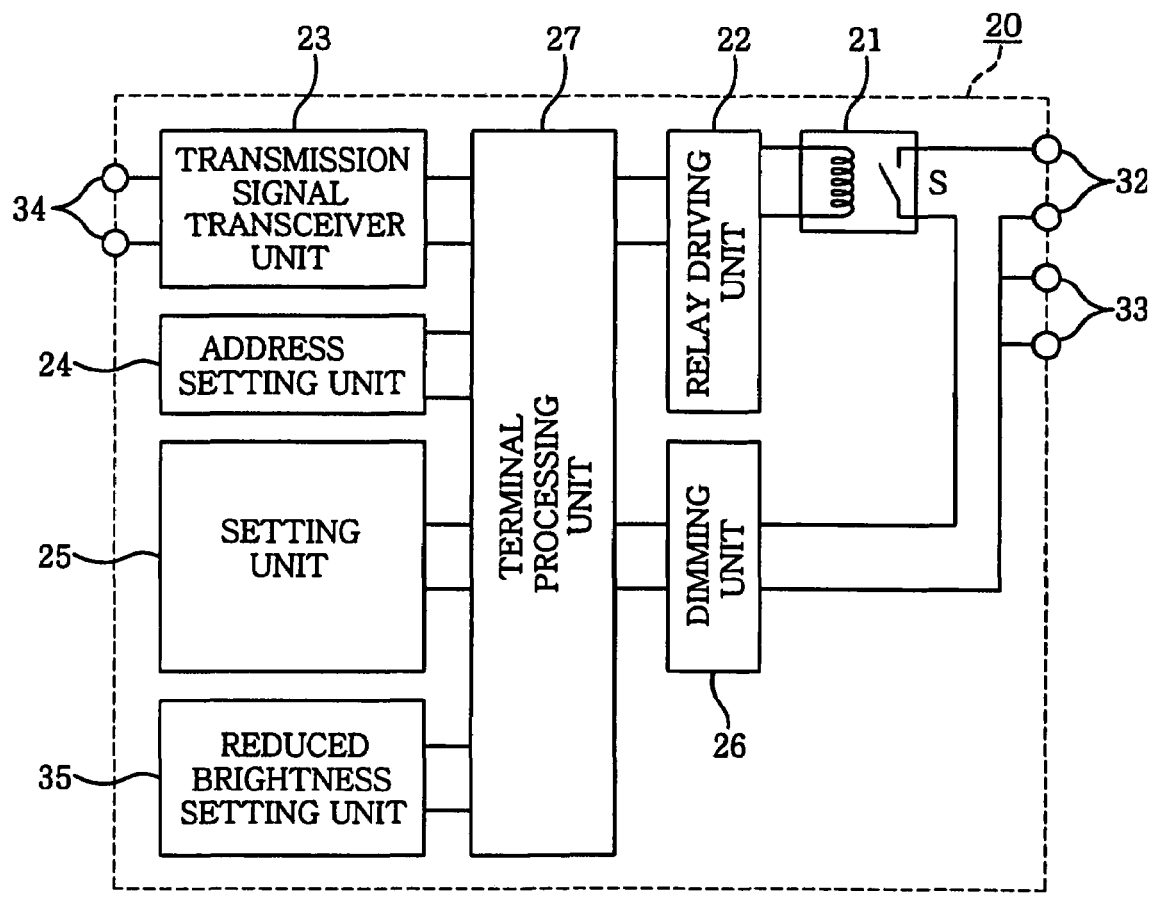
FIG. 11 is a block diagram showing still another configuration of the load terminal in accordance with the second embodiment.
Figure 12:
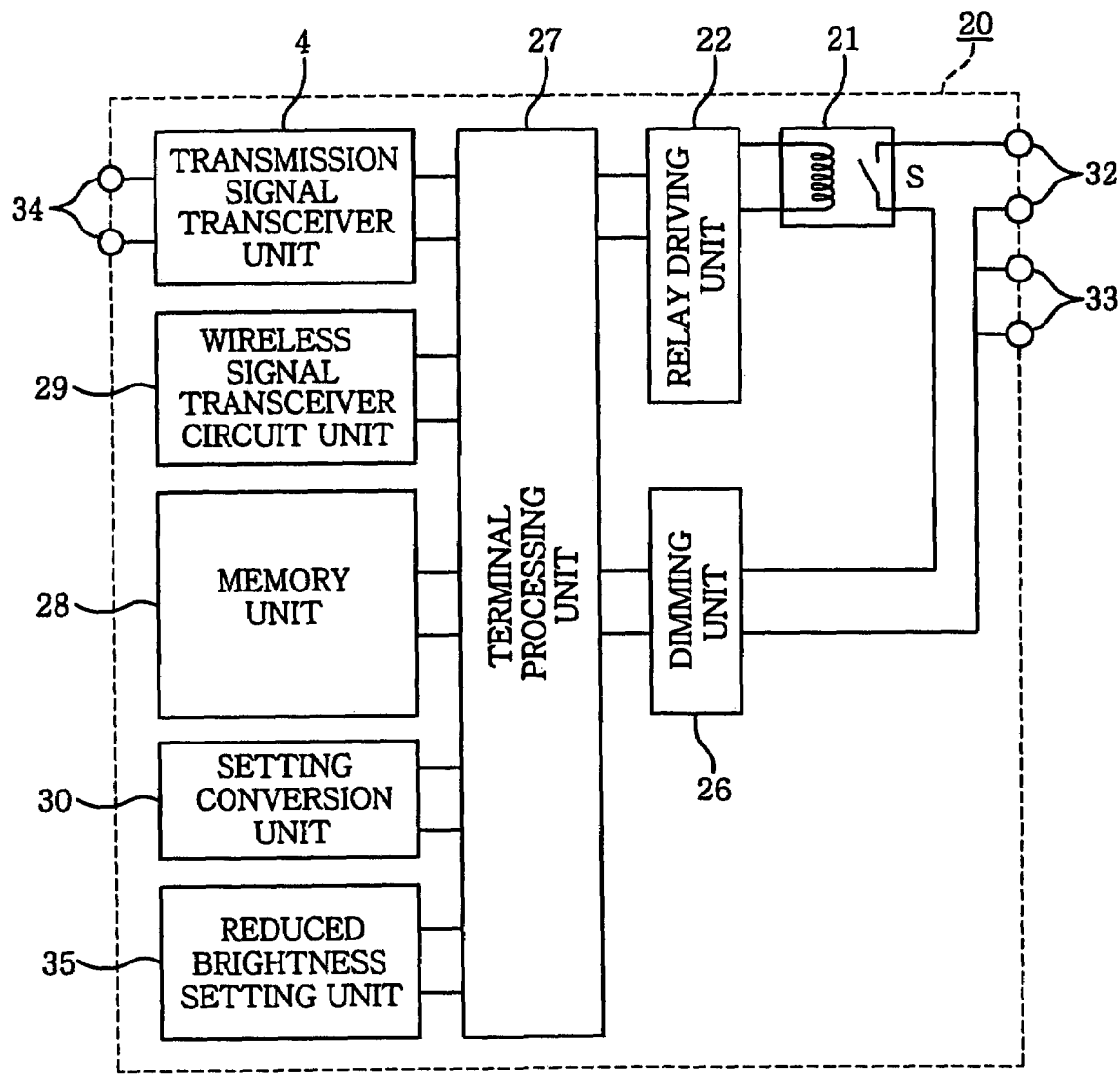
FIG. 12 is a block diagram showing still another configuration of the load terminal in accordance with the second embodiment.
Figure 13:
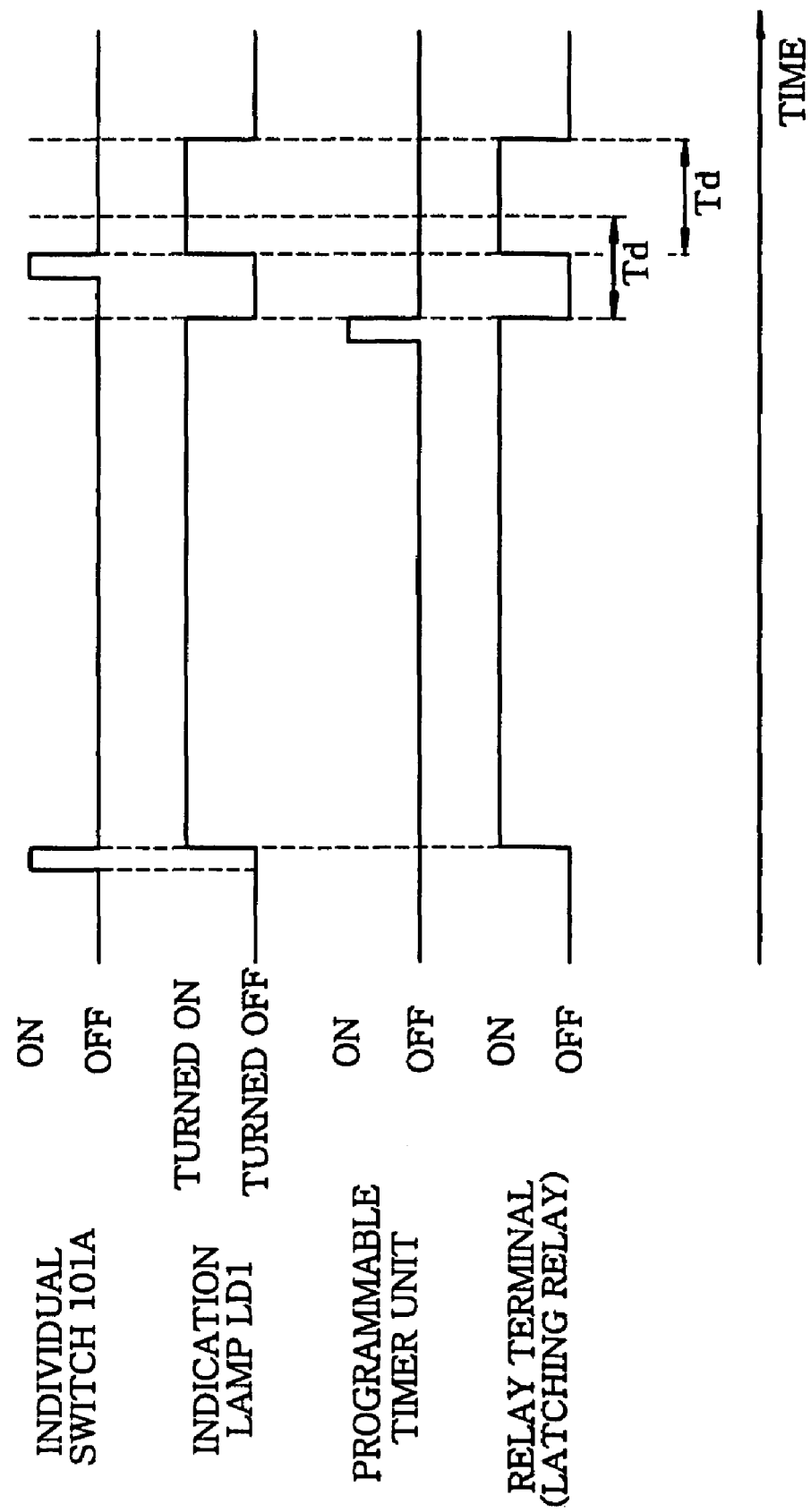
FIG. 13 is a timing chart illustrating the operation of the load terminal in accordance with the second embodiment.
Figure 14:
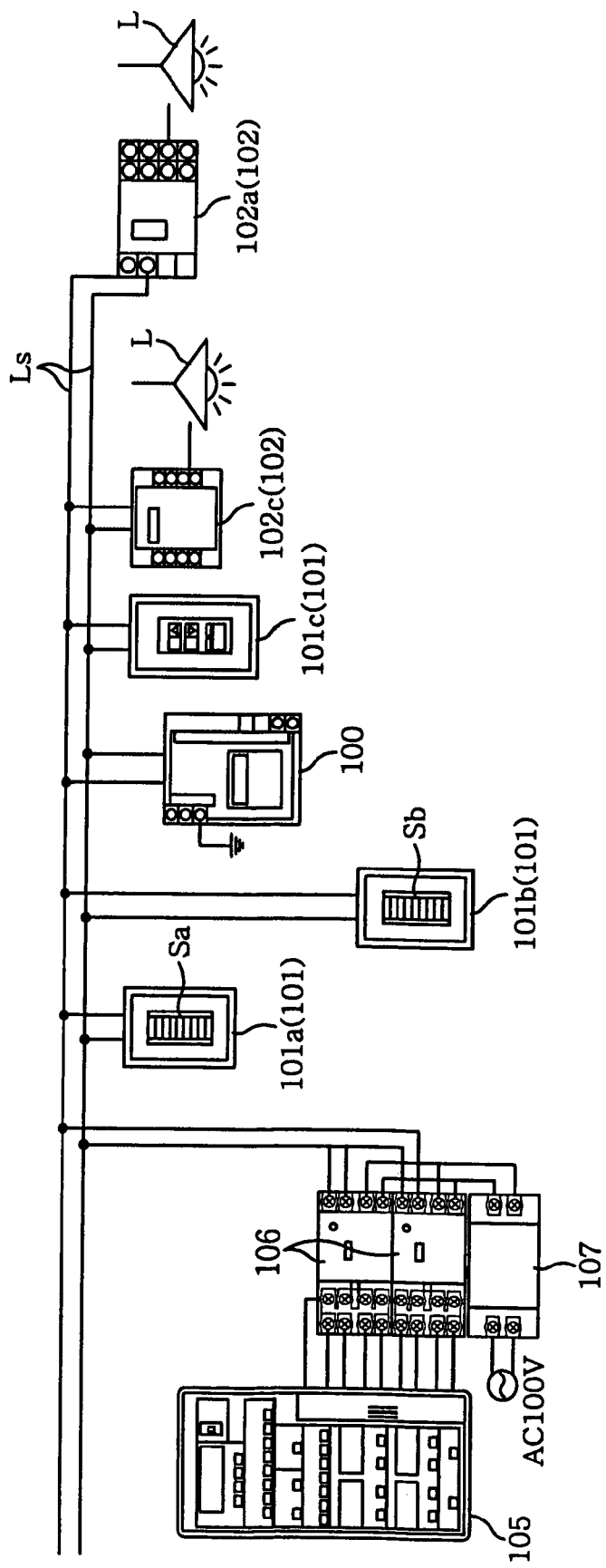
FIG. 14 is a configuration diagram showing an example of a conventional remote controlled load management system.
Figure 15:
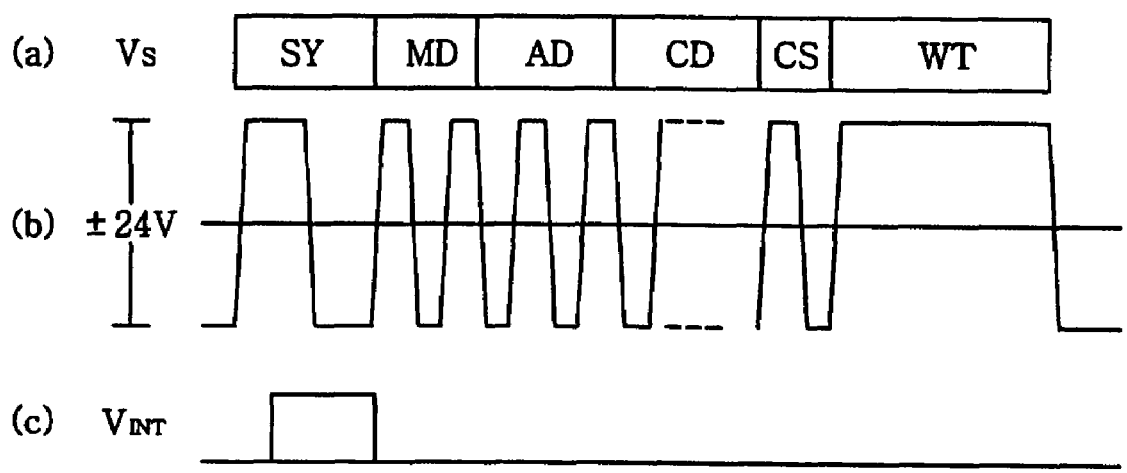
FIG. 15 is a diagram illustrating transmission signals.

Meanwhile, in the second embodiment, warning flashing may be performed at the time of extinction of the illumination load L, but the dimming of the illumination load L may be performed by using the dimming unit 26 instead of warning flashing. In this case, it is preferable to provide a reduced brightness setting unit 35 for setting brightness at the time of warning dimming (hereinafter referred to as "reduced brightness"), as shown in FIG. 11 or 12. The reduced brightness setting unit 35 is provided with a variable resistor, and sets a reduced brightness by adjusting the resistance value of the variable resistor with a manipulation unit (not shown) that is provided on the front surface of the housing 31. Then, the terminal processing unit 27 reads the reduced brightness (the resistance value of the variable resistor) set in the reduced brightness setting unit 35, and performs warning dimming by dimming the illumination load L to the corresponding reduced brightness (refer to the timing chart of FIG. 13). In this case, the circuit diagram of FIG. 11 includes an address setting unit 24 having a DIP switch DS1 and a setting unit 25 having a DIP switch DS2 while the circuit diagram of FIG. 12 includes a memory unit 28, a wireless signal transceiver circuit unit 29 and a setting conversion unit 30.

While the invention has been shown and described with respect to the embodiments, it will be understood by those skilled in the art that various changes and modification may be made without departing from the scope of the invention as defined in the following claims.

What is claimed is:

1. A load terminal for use in a remote controlled load management system including a central controller, one or more switch terminals and one or more load terminals which are connected for intercommunications with each other through a two-wire transmission line, respective addresses being set for the switch terminals and the load terminals, in which the central controller individually accesses the switch terminals and the load terminals by sending a transmission signal containing address data through the transmission line, generates control data based on monitoring data when receiving the monitoring data from a switch terminal which is manipulated during a response waiting slot set in synchronization with the transmission signal, and sends the control data to a load terminal having an address corresponding to that of the switch terminal from which the monitoring data is generated to control an illumination load connected to the load terminal, the load terminal comprising:

a transmission signal transceiver unit for sending and receiving a transmission signal to and from the central controller;

a power supply ON/OFF unit for allowing/cutting a power supply to the illumination load; and a control unit for, when a transmission signal including a control data instructing to turn off the illumination load is received by the transmission signal transceiver unit, starting to count a delay time and sending to the central controller monitoring data indicating that the illumination load has been turned off while controlling the power supply ON/OFF unit to keep the power supply to the illumination load;

wherein the control unit restarts the count of the delay time when the transmission signal transceiver unit receives a transmission signal including a control data instructing to turn on the illumination load during the count of the delay time from the central controller, and controls the power supply ON/OFF unit to stop the power supply to the illumination load after termination of the count of the delay time in case the transmission signal transceiver unit receives no transmission signal including a control data instructing to turn on the illumination load from the transmission unit during the count of the delay time.

2. The load terminal as set forth in claim 1, wherein the power supply ON/OFF unit drives an external relay provided in a power supply line from a power source to the illumination load.

3. The load terminal as set forth in claim 2, wherein the control unit controls the power supply ON/OFF unit to turn off and then on the illumination load at a time when to start the count of the delay time in response to the control data instructing to turn off the illumination load.

4. The load terminal as set forth in claim 1, wherein the power supply ON/OFF unit is provided with a relay provided in a power supply line from a power source to the illumination load and drives the relay.

5. The load terminal as set forth in claim 4, wherein the control unit controls the power supply ON/OFF unit to turn off and then on the illumination load at a time when to start the count of the delay time in response to the control data instructing to turn off the illumination load.

6. The load terminal as set forth in claim 1, wherein the control unit controls the power supply ON/OFF unit to turn off and then on the illumination load at a time when to start the count of the delay time in response to the control data instructing to turn off the illumination load.

7. The load terminal as set forth in claim 1, further comprising dimming unit for performing dimming by controlling an amount of power supplied to the illumination load, wherein the control unit turns on the illumination load in a rated mode or performs dimming lighting on the illumination load with the dimming unit during the count of the delay time.

8. The load terminal as set forth in claim 7, wherein the control unit controls the power supply ON/OFF unit to turn off and then on the illumination load at a time when to start the count of the delay time in response to the control data instructing to turn off the illumination load.

* * * * *